United States Patent [19]

Scheib et al.

[11] Patent Number: 5,553,947

[45] Date of Patent: Sep. 10, 1996

[54] GUIDE RAIL FOR RAILBORNE LOAD CARRIERS

[75] Inventors: Frank Scheib, Neunkirchen; Michael Brunk, Schwalbach; Rainer Kleber, Sulzbach, all of Germany

[73] Assignee: INA Walzlager Schaeffler KG, Germany

[21] Appl. No.: 549,696

[22] PCT Filed: Mar. 26, 1994

[86] PCT No.: PCT/EP94/00962

§ 371 Date: Nov. 6, 1995

§ 102(e) Date: Nov. 6, 1995

[87] PCT Pub. No.: WO94/24444

PCT Pub. Date: Oct. 27, 1994

[30] Foreign Application Priority Data

Apr. 21, 1993 [DE] Germany .................. 43 13 074.7

[51] Int. Cl.$^6$ .............................. F16C 29/00; B61B 3/00
[52] U.S. Cl. ............................ 384/55; 104/107; 384/50
[58] Field of Search ............................ 384/7, 26, 42, 384/49, 50, 55, 59; 104/106, 107, 109, 110

[56] References Cited

U.S. PATENT DOCUMENTS

| 4,520,733 | 6/1985 | Willmann ............... 104/110 X |
| 4,545,881 | 4/1897 | Goedecke et al. ............ 384/55 X |
| 4,722,150 | 2/1988 | Jacobs et al. ................. 384/50 |
| 4,776,282 | 10/1988 | Ishikura et al. ............... 104/109 |
| 5,211,279 | 5/1993 | Abbestam et al. ............ 384/55 X |

FOREIGN PATENT DOCUMENTS

| 2559560 | 8/1985 | France . |
| 2639081 | 5/1990 | France . |
| 3631401 | 3/1988 | Germany . |
| 3839091 | 5/1990 | Germany . |
| 9011413 | 10/1990 | Germany . |
| 4118479 | 1/1992 | Germany . |
| 4111551 | 10/1992 | Germany . |
| 9211223 | 11/1992 | Germany . |
| 9212353 | 7/1992 | WIPO . |

*Primary Examiner*—Thomas R. Hannon
*Attorney, Agent, or Firm*—Bierman & Muserlian

[57] ABSTRACT

In a guide rail (14) for railborne load carriers comprising a support (13) and at least one running rail (15) arranged in a groove (2) of the support (13), this support (13) is an extruded hollow profile. This results in a simple manufacturing method and a small material requirement.

8 Claims, 1 Drawing Sheet

GUIDE RAIL FOR RAILBORNE LOAD CARRIERS

The invention concerns a guide rail for railborne load carriers comprising a support made as an extruded hollow profile and at least one running rail arranged in a groove of the support, a cavity of the support being divided into a lower and an upper chamber by a cross-web, while an outer wall of the lower chamber extends parallel to the cross-web.

A guide rail of this type is known from EP-B-0 213 160 and comprises two parallel running rails mounted and fixed in parallel grooves of the support which are open towards the outside. These running rails constitute raceways for rolling elements of a load carrier in the form of a carriage mounted slidably on the guide rail. The support in the case of this known guide rail is a solid component so that a considerable amount of material is required for its manufacture. In the majority of uses, however, the rigidity offerred by solid guide rails is not required, or the guide rail can be supported along its entire length so that reduced geometric moments of inertia do not have a negative effect.

CH-PS 557 483 discloses a device for the linear guidance of a machine component comprising a guide rail of a hollow configuration. For this purpose, an I-shaped support is surrounded by two profiled sheets of a particular shape resulting in the formation of two cavities adjacent to the profiled support. Two ball raceways are formed on the outer surface of each of these profiled sheets so that the sheets constitute a part of a linear rolling bearing. Such guide rails have the disadvantage that the special configuration of the I-shaped support on both sides of its length and, above all, the complicated shape of the profiled sheets makes it very expensive to manufacture.

A guide rail of the type initially mentioned is known from the document DE-U-90 11 413. The support used therein comprises undercut longitudinal grooves for lodging running rails. Access to these longitudinal grooves is from the inside of the upper chamber. In the region of each of these longitudinal grooves for lodging running rails, there is provided in the support, another longitudinal groove which is accessible from the outside and serves to connect the support to other parts of the structure. These grooves therefore have to be precisely dimensioned. In a transverse cross-section, this support has a substantially U-shaped configuration with the arms of the U extending upwards from the horizontal crossbar. The upper chamber of this support is therefore only closed on three sides and the fourth or upper side comprises a longitudinal slot. This support therefore does not possess the high rigidity of a closed hollow profile.

It is an object of the invention to provide a simple-to-manufacture guide rail for railborne load carriers and to configure the guide rail so that material requirement is reduced.

The invention achieves this object by the fact that the upper chamber adjacent to the groove of the support is closed by a further outer wall of the support, which wall extends parallel to the cross-web. This upper chamber adjacent to the groove of the support can cooperate with a groove bottom of the groove to absorb a part of the plastic deformation taking place during calibration.

A specially configured groove bottom of the two grooves in the guide rail for lodging the running rails permits calibration and thus also economic chipless manufacturing. Due to the cavities or chambers in the calibration region, the extrusion molding manufacturing tolerance zone of the support can be calibrated to the required size, the hollow profile permitting a very high degree of plastic deformation of the support. The plastic deformation of the material of the support caused by the calibrating operation permits the running rails to extend at an exactly constant distance from each other in the grooves of the previously calibrated support along the entire length of the guide rail. If the running rails are rolled into the grooves, they have such a small tolerance range that the carriage (load carrier) for this system can be made with four central roller pins. The small tolerance range offers the advantage that the guide rails can be manufactured economically by planing which guarantees the exchangeability of the rails. The use of four central pins effects a cost reduction in the manufacture of the carriage and has the advantage that the carriage can be fully adjusted by the manufacturer, and the user has only to push it onto the rail.

The fixing of the running rails in the grooves of the support does not necessarily have to be effected by rolling-in. The grooves can also be configurd so that their U-arms are elastically displaceable outwards and retain the running rail by their restoring forces. The base region of the support comprises a central recess which increases the precision of mounting because lateral stop surfaces in the base region of the support help to obtain a better alignment of the guide rail during mounting.

Hollow profiles are easily available commercially in the form of semi-products and can be made, for example, of non-ferrous materials, particularly of an aluminium alloy. The running rail arranged and fixed in the groove of such a support can be made of steel or another high strength, wear-resistant material. To obtain a reliable guidance of the railborne load carrier, two parallel running rails inserted into grooves of the support are used in most cases.

The cavity of the support is divided into an upper and a lower chamber by a cross-web. If several groups of aligned bores are provided in an outer wall of the upper chamber, in an outer wall of the lower chamber and in the cross-web, the guide rail can be fixed in a simple manner on a connecting structure by fixing screws inserted into the bores. In this case, the surface of the cross-web delimiting the upper chamber is advantageously a flat surface which serves as a support surface for the screw heads of the fixing screws.

Due to its configuration as a hollow profile, the guide rail of the invention permits, for example, cables or wires of limit switches to be run through the chambers so that they are protected. The outwardly open bores for the fixing screws can easily be sealed by means of sealing caps after insertion of the fixing screws. However, it is also possible to fix the guide rail to the connecting structure by means of clamping elements which engage the base region of the guide rail. In this way, the chambers of the guide rail do not need to open outwards through bores and can be used as pressure chambers.

Examples of embodiment of the invention are represented in the drawings and will be described more closely below:

Figure 1:
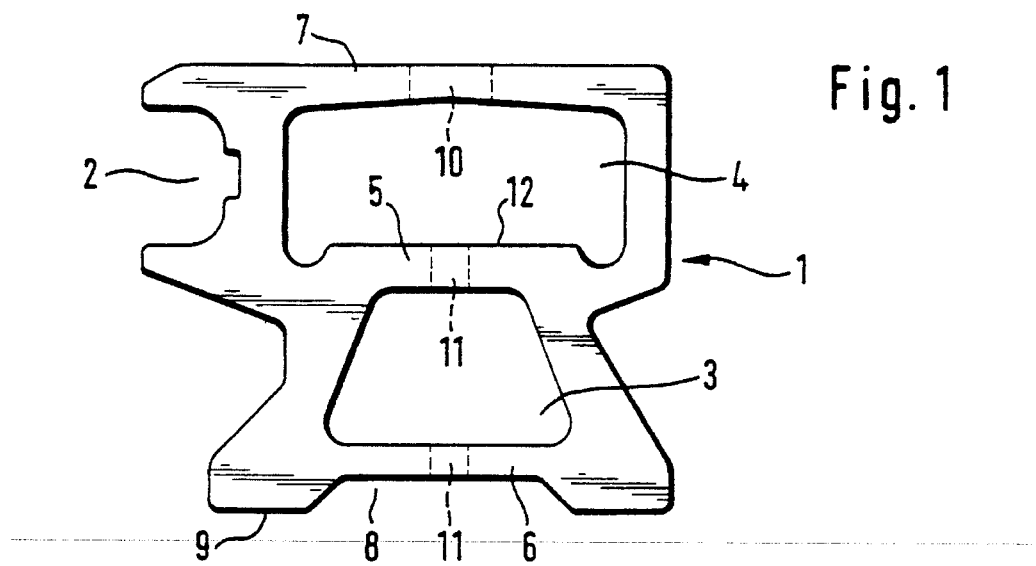
FIG. 1 is an end view of a first embodiment of a support for a guide rail.

The support 1 shown in FIG. 1 is made as a hollow profile with ony one groove 2 for a running rail. The support 1 is divided into a lower chamber 3 and an upper chamber 4 by a horizontal cross-web 5. An outer wall 6 of the lower chamber 3 and an outer wall 7 of the upper chamber 4 extend parallel to the cross-web 5. A recess 8 is arranged below the outer wall 6 in the base surface 9 of the support 1, while several groups of aligned vertical bores are arranged at intervals along the center of the support 1 so that each bore 10 of the outer wall 7 is aligned with two bores 11 provided in the cross-web 5 and in the outer wall 6. A fixing screw can be inserted through each bore 10 into the chambers 4 and 3 of the support 1 to fix the support on the connecting structure on which the base surface 9 rests. Facing the upper chamber 4, the cross-web 5 comprises a flat support surface 12 for supporting the screw heads.

Figure 2:
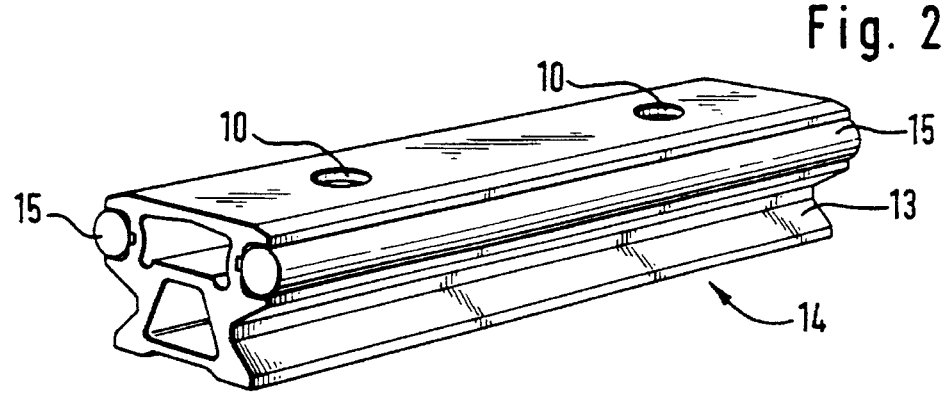
FIG. 2 shows a second embodiment of a guide rail in a perspective view.
Figure 3:
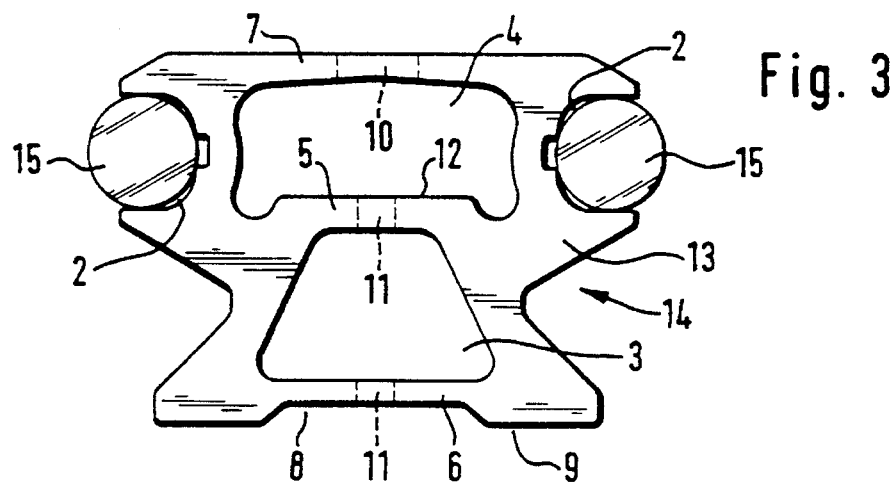
FIG. 3 is an end view of the guide rail of FIG. 2.

The support 13 of the guide rail 14 of the embodiment of FIGS. 2 and 3 is basically of the same structure as the support 1 of FIG. 1. The support 13, however, comprises two parallel grooves 2 for lodging two parallel running rails 15. These grooves 2 likewise comprise a groove bottom which permits a plastic deformation (calibration) of the support 13 upon insertion of the running rails 15. The upper chamber 4 permits a very high degree of plastic deformation for calibration and absorbs the major part of the deformation.

| List of Reference Numbers |         |
|---|---|
| 1 | Support |
| 2 | Groove |
| 3 | Lower chamber |
| 4 | Upper chamber |
| 5 | Cross-web |
| 6 | Outer wall |
| 7 | Outer wall |
| 8 | Recess |
| 9 | Base surface |
| 10 | Bore |
| 11 | Bore |
| 12 | Support surface |
| 13 | Support |
| 14 | Guide rail |
| 15 | Running rail |

We claim:

1. A guide rail for railborne load carriers comprising a support (1, 13) made as an extruded hollow profile and at least one running rail (15) arranged in a groove (2) of the support (1, 13), a cavity of the support (1, 13) being divided into a lower chamber (3) and an upper chamber (4) by a cross-web (5), while an outer wall (6) of the lower chamber (3) extends parallel to the cross-web (5), characterized in that the upper chamber (4) adjacent to the groove (2) of the support (1, 13) is closed by a further outer wall (7) of the support (1, 13), which wall (7) extends parallel to the cross-web (5).

2. A guide rail of claim 1 wherein the upper chamber (4) adjacent to the groove (2) of the support (1, 13) cooperates with a groove bottom of the groove (2) to absorb a part of a plastic deformation taking place during calibration.

3. A guide rail of claim 1 wherein two or more parallel running rails (15) are arranged in grooves (2) of the support (13).

4. A guide rail of claim 1 wherein the support (1, 13) is made of an aluminium alloy.

5. A guide rail of claim 1 wherein the running rail (15) is a steel rail.

6. A guide rail of claim 1 wherein the running rail (15) is made of a high strength wear-resistant material.

7. A guide rail of claim 1 wherein a group of aligned bores (10, 11) for each one of a plurality of fixing screws is arranged in the outer wall (6) of the lower chamber (3), in an outer wall (7) of the upper chamber (4) and in the cross-web (5) of the support (1, 13).

8. A guide rail of claim 1 wherein the cross-web (5) comprises a flat surface defining the upper chamber (4) and serving as a support surface (12) for screw heads of fixing screws.

* * * * *

UNITED STATES PATENT AND TRADEMARK OFFICE
CERTIFICATE OF CORRECTION

PATENT NO. : 5,553,947

DATED : September 10, 1996

INVENTOR(S) : FRANK SCHEIB et al

It is certified that error appears in the above-identified patent and that said Letters Patent is hereby corrected as shown below:

On the title page,

Under heading No. [56], change the number of the second reference to read

--4,656,881-- and change "1887" to

--1987--

Signed and Sealed this

Twenty-third Day of December, 1997

Attest:

Attesting Officer

BRUCE LEHMAN

Commissioner of Patents and Trademarks